(12) United States Patent
Masputra et al.

(10) Patent No.: US 8,935,353 B1
(45) Date of Patent: Jan. 13, 2015

(54) SYSTEM AND METHOD FOR ATOMIC FILE TRANSFER OPERATIONS OVER CONNECTIONLESS NETWORK PROTOCOLS

(75) Inventors: Cahya A. Masputra, Millbrae, CA (US); Sunay Tripathi, San Jose, CA (US); Thirumalai Srinivasan, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 2509 days.

(21) Appl. No.: 11/039,036

(22) Filed: Jan. 20, 2005

(51) Int. Cl.
 *G06F 15/167* (2006.01)

(52) U.S. Cl.
 USPC ........................................................ 709/212

(58) Field of Classification Search
 USPC ........................................................ 709/212
 See application file for complete search history.

(56) References Cited

U.S. PATENT DOCUMENTS

| | | | | |
|---|---|---|---|---|
| 6,092,170 | A * | 7/2000 | Kori .............................. | 711/202 |
| 6,405,237 | B1 * | 6/2002 | Khalidi et al. ................ | 709/203 |
| 6,738,821 | B1 * | 5/2004 | von Stamwitz et al. ...... | 709/230 |
| 6,757,367 | B1 | 6/2004 | Nicol | |
| 6,820,117 | B1 | 11/2004 | Johnson | |
| 2002/0091863 | A1 * | 7/2002 | Schug .......................... | 709/250 |
| 2002/0156613 | A1 * | 10/2002 | Geng et al. ..................... | 703/23 |
| 2004/0103225 | A1 * | 5/2004 | McAlpine et al. .............. | 710/52 |
| 2004/0107419 | A1 * | 6/2004 | Blackmore et al. ........... | 718/100 |
| 2004/0122834 | A1 * | 6/2004 | Durrant ........................ | 707/100 |
| 2005/0268067 | A1 * | 12/2005 | Lee et al. ....................... | 711/202 |
| 2006/0080668 | A1 * | 4/2006 | Blackmore et al. ........... | 719/312 |
| 2006/0095659 | A1 * | 5/2006 | New et al. ..................... | 711/112 |

OTHER PUBLICATIONS

Anderson et al., "Failure-Atomic File Access in an Interposed Network Storage System," 2000 IEEE, 2000, (pp. 157-164).
Gifford et al., "The Cedar File System," Communications of the ACM, vol. 31, No. 3, Mar. 1988, (pp. 288-298).
"sendfile.man.txt," Extended Library Functions, Nov. 19, 2003, (5 pages).
"sendfileev.man.txt," Extended Library Functions, Apr. 25, 2001, (5 pages).
"dataflow," Subversion, 2004, downloaded Mar. 29, 2010 from: http://svn.phys.ucalgary.ca:8080/websvn/filedetails. php?repname=dataflow&path=%2Ftrunk%2Fudp_sendfile.c, 4 pages.

* cited by examiner

*Primary Examiner* — Boris Gorney
(74) *Attorney, Agent, or Firm* — Robert C. Kowert; Meyertons, Hood, Kivlin, Kowert & Goetzel, P.C.

(57) ABSTRACT

A system for atomic file transfer operations over connectionless network protocols includes a processor and a memory coupled to the processor. The memory contains program instructions executable by the processor to implement an operating system including a system call interface for sending one or more data files to another system over a network via a connectionless network protocol. In response to an invocation of the system call by an application, the operating system is configured to send the one or more data files to the other system over the network without the application copying contents of the data files into application address space.

19 Claims, 7 Drawing Sheets sendFile(endPoint ep,
        fileDescriptor fd,
        startOffset so,
        amountToSend ats,
        packetSize ps,
        flags fg)

SYSTEM AND METHOD FOR ATOMIC FILE TRANSFER OPERATIONS OVER CONNECTIONLESS NETWORK PROTOCOLS

BACKGROUND OF THE INVENTION

1. Field of the Invention

This invention relates to computer systems and, more particularly, to data transmission over computer networks.

2. Description of Related Art

Many business organizations provide services that require transmission of large volumes of data to customers over communication networks such as intranets or the Internet. For example, multimedia providers may need to transmit audio and video files on demand from centralized or distributed servers to hundreds or thousands of clients. As the usage of broadband connections to the Internet increases, the demand for consumer multimedia applications such as video and audio subscription services is expected to continue growing rapidly. Within corporate intranets, where high bandwidth interconnects such as dedicated T1 lines may often be deployed, other multimedia applications such as video conferencing, long distance education (e.g., using taped versions of courses), broadcasts of company events to worldwide locations, and the like are quickly becoming more popular. In each of these kinds of applications, large amounts of data (e.g., from tens of megabytes to several gigabytes), which may typically be stored within a single file or a set of files, may need to be transmitted to a large number of clients.

Frequently, file transmission is performed using one or more protocols of the TCP/IP (Transmission Control Protocol/Internet Protocol) family of network protocols. For reliable transmissions, a connection-oriented protocol such as TCP may be employed. However, TCP and other reliable protocols may not be best suited for transmission of data for some kinds of applications where some level of packet loss may be tolerated. Reliable connection-oriented protocols like TCP automatically perform flow control and congestion control, for example by shrinking window sizes in response to a detection of congestion or packet loss. Thus, for example, if a few packets of a video file are lost during a transmission over a reliable connection-oriented protocol, the networking software implementing the protocol at the server may throttle the flow of subsequent packets, and may even stop transmitting data packets under certain conditions. Such automatic throttling of data transfer may result in unacceptable delays and interruptions at the client. Instead of demanding guaranteed in-sequence transmission for each and every packet of an audio or video file, in many cases audio and video client playback applications may accept a certain rate of packet loss, as long as new packets keep arriving, allowing playback to continue even if a few frames of a video or a few notes of an audio recording are lost.

As a result of the potentially undesirable consequences of transmitting audio or video data over connection-oriented protocols like TCP described above, many multimedia applications may be configured to use connectionless and potentially unreliable protocols like UDP (User Datagram Protocol) instead. A connectionless protocol may provide unreliable delivery of data packets using a protocol like IP to transport messages between machines. Packets sent over a connectionless protocol may be lost, duplicated, delayed, or delivered out of order. A server expects no explicit acknowledgments at the protocol level when it transmits data over a connectionless protocol. Consequently, networking software at the server may often be configured to ignore packet loss, network congestion and other similar problems. Instead of throttling data transmission of a video or audio file in the presence of errors, a server using a connectionless protocol may simply continue with transmissions of subsequent packets, which may often be the desired behavior from the point of view of video or audio playback applications at the clients.

Traditionally, however, the use of connectionless network protocols, such as UDP, for file transmission has been hampered by a number of factors. For example, the server application transmitting a multimedia file may typically have to subdivide the file into small segments, initialize a packet header including the client's address for each segment, and send each segment using a separate invocation of a system call. In addition, each segment of the file to be transmitted may have to copied twice at the server: first, the segment may be copied from a storage device such as a disk into a buffer in the application's address space, and then, the segment may be copied from the buffer into an operating system kernel address space for transmission over the connectionless protocol. As the number of clients concurrently handled by a given file server increases, the complexity for the server application of simultaneously managing multiple transmissions, and the processing costs incurred by multiple copies for each segment of data, may both increase to prohibitive levels.

SUMMARY

Various embodiments of a system and method for atomic file transfer operations over connectionless network protocols are disclosed. According to one embodiment, a system includes a processor and a memory coupled to the processor. The memory contains program instructions executable by the processor to implement an operating system including a system call interface for sending one or more data files to another system over a network via a connectionless network protocol. In addition, the memory contains an application configured to invoke the system call interface to initiate sending of data files to the other system. In response to an invocation of the system call interface by the application, the operating system is configured to send the one or more data files to the other system without the application copying contents of the data files into application address space.

Thus, in an embodiment, the application may transfer responsibility for managing details of file transmission for one or more files over the connectionless network protocol to the operating system with a single invocation of the system call interface. The operating system, rather than the application, may generate the headers of the datagrams used to transmit the contents of the data files. Also, the operating system, rather than the application, may read the data files and copy the contents of the data files to the datagram bodies; the application may not need to allocate any memory buffers in application address space to store contents of the data files. The application, having invoked the system call interface, may be free to perform other application-level tasks while the contents of the data files are transferred over the network.

Any desired connectionless networking protocol, such as the User Datagram Protocol (UDP) may be used for the transmission of the data files. The operating system may provide one or more functions for invoking the system call interface. In one embodiment, an invocation of the system call interface may include parameters to specify a data file, a connection endpoint to be used for the data transfer (such as a socket), a starting address within the data file at which data transmission is to begin, an amount of data of the data file to be sent, and a packet size. In another embodiment, an invocation of the system call interface may include a parameter to specify multiple file specifications, where, for example, each file specification identifies a particular data file, a starting offset within the data file, and an amount of data of the data file to be transmitted. Thus, applications may send one or more data files in their entirety with a single invocation of the system call interface, or may send portions of one or more data files. In some embodiments, the operating system may include a kernel cache to store one or more data files, so that, for example, a recently requested data file may be sent to a client from the kernel cache instead of being read from a storage device such as a disk. Some data files may be pre-formatted for datagram-based transmission, e.g., by inserting datagram boundary indicators or record boundary indicators within the file.

Figure 1:
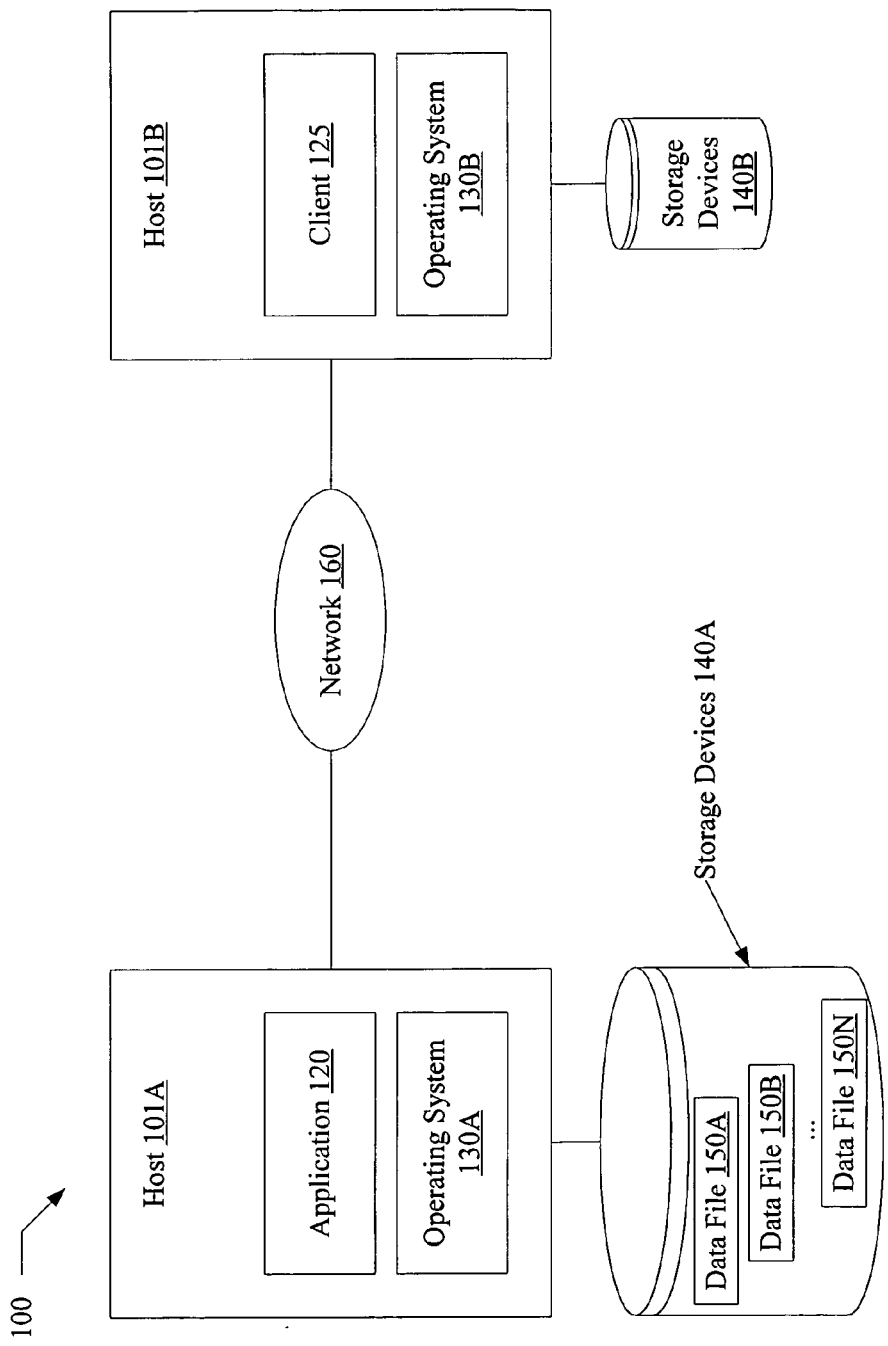
FIG. 1 is a block diagram illustrating one embodiment of a system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

FIG. 1 is a block diagram illustrating one embodiment of a system 100. The system includes hosts 101A and 101B coupled by a network 160. One or more data files 150A, 150B, . . . 150N (which may collectively be referred to herein as data files 150) may be stored in one or more storage devices 140A accessible from host 101A. An operating system 130A at host 101A is configured to provide a system call interface to send one or more data files via a connectionless network protocol to another host, such as host 101B. Further details on the system call interface are provided below in conjunction with the descriptions of FIG. 4 and FIG. 5. An application 120 at host 101A is configured to invoke the system call interface to send one or more data files 150 to a client 125 at host 101B. In response to an invocation of the system call interface by application 120, operating system 130A is configured to send one or more data files 150 to client 125 over the network, without the application 120 copying contents of the data files into application address space. In some embodiments, as also described in further detail below, the entire contents of one data file 150 or multiple data files 150 may be sent to client 125 with a single invocation of the system call interface, i.e., atomically from the perspective of application 120. The system call interface may also allow application 120 to send specified portions of one or more data files 150, instead of the entire contents of the data files. Host 101B may include an operating system 130B, and may have access to one or more storage devices 140B, at which client 125 may be configured to store the contents of the transmitted data files 150 in some embodiments.

Application 120 may be any type of application configured to transmit data over a network. In some embodiments, application 120 may be a server providing some type of service to one or more clients 125, while in other embodiments, application 120 may transmit data to a peer application at another host, e.g., in a peer-to-peer configuration. In one embodiment, for example, application 120 may be a multimedia server configured to provide clients 125 with audio and/or video files, or a server configured to provide Voice Over IP (VOIP) services such as long-distance or local telephone services. Client 125 may be any application configured to receive data from another application 120 over a network, such as an audio or video playback application, or a VOIP subscriber application. In some embodiments, data may be transmitted in both directions over network 160 via the connectionless networking protocol: that is, application 120 may be configured to send data to client 125, and client 125 may be configured to send data to application 120. In one embodiment, more than one protocol may be in use for communication between application 120 and client 125: for example, a reliable connection-oriented network protocol may be used to establish a control channel of communication between application 120 and client 125 (for example, for secure client-server authentication), while a connectionless network protocol may be used to transfer file data.

Operating systems 130A and 130B may each be any desired operating system, and may differ from one another in some embodiments. For example, in one embodiment, operating system 130A may be a version of the Solaris™ operating system from Sun Microsystems, while operating system 130B may be a version of a Windows™ operating system provided by Microsoft Corporation, or a version of Linux. Any general-purpose operating system or special purpose operating system (such as a real-time operating system), operable to support a connectionless network protocol and provide a system call interface in the manner described below, may be used at hosts 101A and 101B.

Network 160 may be implemented using any of a number of different hardware and software technologies in different embodiments. For example, in one embodiment, network 160 may be a Local Area Network (LAN), which may be implemented using any desired copper-based networking links such as various versions of Ethernet and/or optical fiber-based networking hardware. In other embodiments, network 160 may be a Metropolitan Area Network (MAN), a Wide Area Network (WAN), or may include links of a distributed network such as the Internet. As described below, a given data file 150 may be transmitted by operating system 130A using one or more datagrams in some embodiments, and successive datagrams may be routed over physically distinct paths of network 160; that is, not all datagrams corresponding to a particular data file 150 may utilize the same set of physical networking links. In some embodiments, network 160 may include one or more wireless links.

Any desired connectionless networking protocol may be utilized for data transmission over network 160. Packets sent via a connectionless networking protocol may be referred to as "datagrams". A datagram sent using a connectionless networking protocol may be lost, duplicated, delayed, or delivered out of order with respect to other datagrams. The connectionless networking protocol may make a "best effort" to deliver all the datagrams, but may provide no guarantee that any given datagram will be delivered. No acknowledgment is required to be sent by the recipient of a datagram to the sender. Datagrams may arrive faster than the recipient can process them, and thus may be dropped at the recipient under certain conditions. A connectionless networking protocol may not detect the occurrence of such events, and/or may not inform the sender or receiver of such events. Within the connectionless networking protocol, each datagram may be treated independently from all other datagrams, and each datagram may, for example, contain a header identifying a destination address. While unreliable data transmission is possible using connectionless networking protocols, in practice only a very small fraction of datagrams sent via a connectionless networking protocol may be lost, duplicated, delayed, or delivered out of order. The level of unreliability of a connectionless data protocol may increase as resources (such as the bandwidth of one or more underlying network links) become exhausted or if network failures occur. Applications such as application 120 that utilize connectionless networking protocols may be configured to handle the problem of unreliable data transmission, for example by implementing higher-level protocols that may detect the occurrence of datagram transmission delay or datagram loss, and respond to such occurrences in application-specific ways (e.g., by compensating for or ignoring the unreliable data transmission).

In one embodiment, the connectionless networking protocol utilized by operating system 130A may be the User Datagram Protocol (UDP). UDP provides connectionless datagram delivery using the Internet Protocol (IP) to transport messages between machines. UDP and IP each belong to the Transmission Control Protocol/Internet Protocol (TCP/IP) protocol suite commonly used for communication over the Internet. Like other connectionless protocols, UDP does not use acknowledgments to make sure datagrams arrive, it does not order incoming datagrams, and it does not provide feedback to control the rate at which data flows between a sender (such as application 120) and a receiver (such as client 125).

Figure 2:
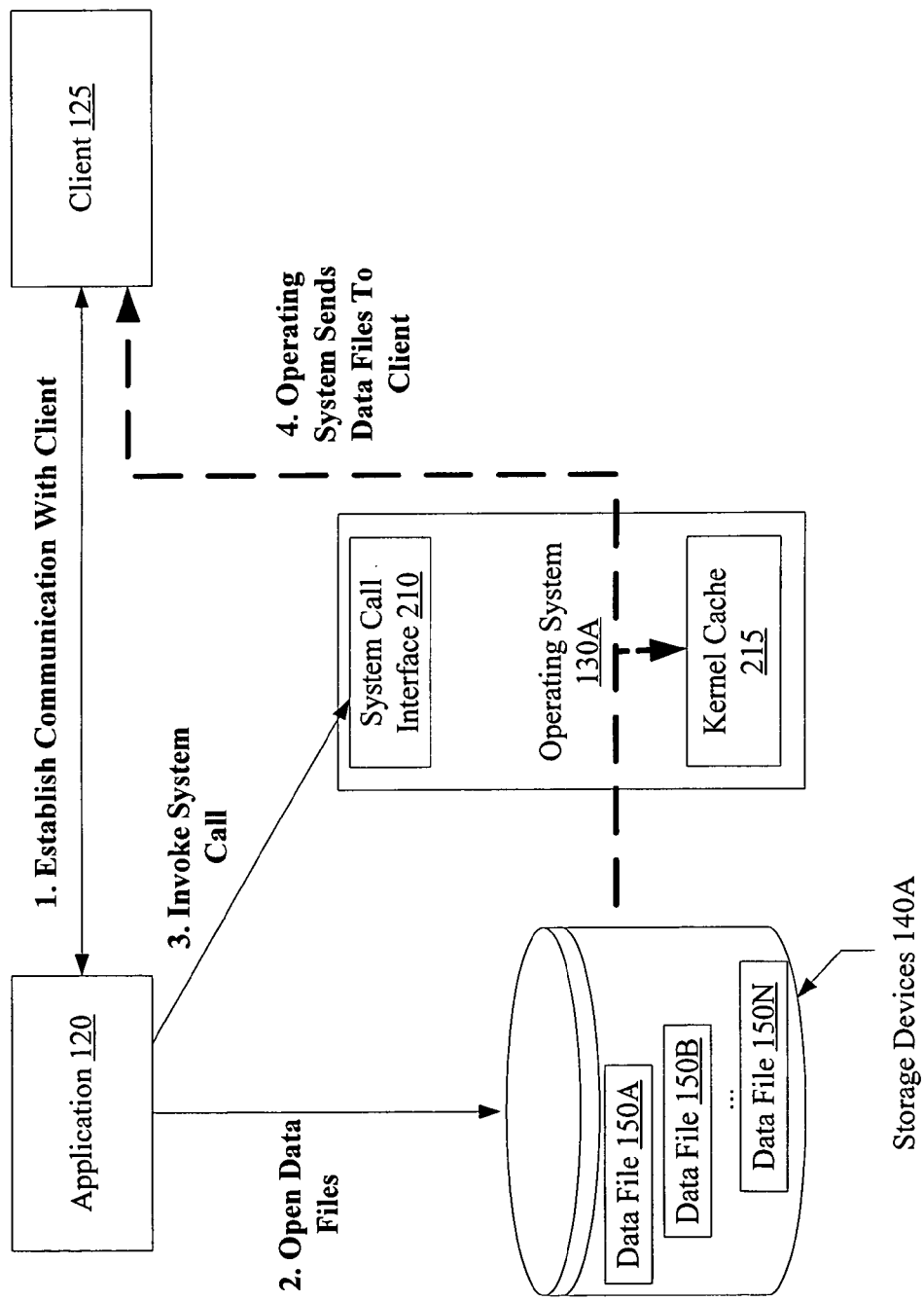
FIG. 2 is a block diagram illustrating aspects of the operation of an application and an operating system according to one embodiment.

FIG. 2 is a block diagram illustrating aspects of the operation of application 120 and operating system 130A according to one embodiment. Operating system 130A may include system call interface 210, which may be invoked by application 120 to send data files 150 to client 125. In preparation for sending one or more data files 150 to client 125, application 120 may be configured to establish communication with client 125 over network 160, as indicated by the bidirectional arrow labeled "1". The communication may be established via a connectionless network protocol. As indicated by the arrow labeled "2", application 120 may then be configured to open the data files 150 targeted for transmission to client 125. Each of these steps (i.e., the establishment of communication with client 125 and the opening of data files 150) may be performed by application 120 using one or more system call interfaces (other than system call interface 210) provided by operating system 130A in some embodiments as described in further detail below. It is noted that in some embodiments, application 120 may be configured to open the data files before establishing communication with client 125; that is, the operations corresponding to arrows "1" and "2" may be performed in any order or in parallel.

After the data files 150 have been opened, application 120 may be configured to invoke system call 210 to initiate the sending of contents of the opened data files 150, as illustrated by the arrow labeled "3" in FIG. 2. In response to the invocation of system call 210, operating system 130A may send the data files 150 to client 125 over network 160 using the connectionless network protocol (as indicated by the broken arrow labeled "4"), without application 120 copying contents of data files 150 into application address space. That is, application 120 may simply invoke the system call 210 with a pointer to the data, such as a file descriptor, and does not need to read the file or copy the file contents into application address space for the purpose of sending the file contents to client 125. Part or all of the contents of the data files 150 may be copied into application address space for other purposes; however, such a copy is not required for the invocation of system call 210. In some embodiments, operating system 130A may be configured to read the data files 150 from storage devices 140A in order to send the data files to client 125. In the embodiment depicted in FIG. 2, operating system 130A may also be configured to store a copy of one or more data files 150 within a kernel cache 215. If application 120 invokes system call interface 210 to send a data file 150 that is already resident in kernel cache 215, operating system 130A may be configured to send the data file 150 to the client 125 from kernel cache 215, instead of reading the data file from storage device 140A. Further details of specific operations that may be performed by application 120 and operating system 130A during the steps illustrated in FIG. 2 are provided below.

Figures 3, 4:
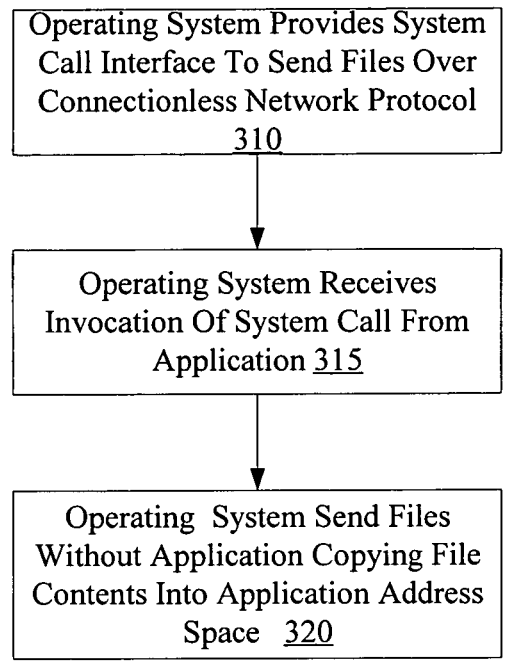
FIG. 3 is a flow diagram illustrating aspects of the operation of an operating system according to one embodiment.
FIG. 4 and FIG. 5 illustrate two specific examples of function names and parameters that may be used to invoke a system call interface provided by an operating system according to one embodiment.
Figure 5:
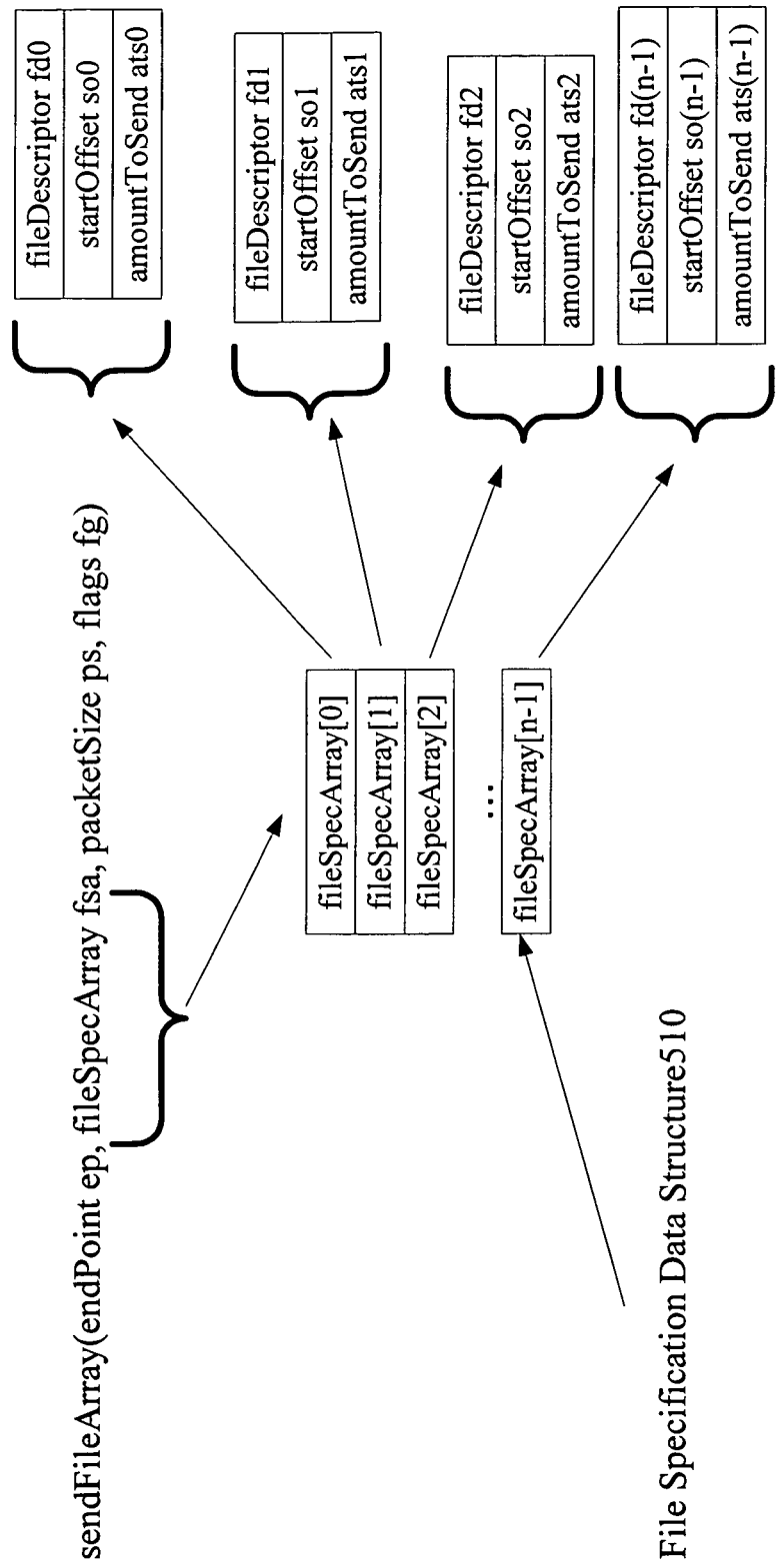

FIG. 3 is a flow diagram illustrating aspects of the operation of operating system 130A according to one embodiment. As shown in block 310, operating system 130A may be configured to provide system call interface 210 allowing one or more data files 150 to be sent via a connectionless network protocol to a destination system. FIG. 4 and FIG. 5 illustrate two specific examples of function names and parameters that may be used to invoke system call interface 210 provided by operating system 130A, according to one embodiment. In FIG. 4, the system call interface 210 is invoked by calling a function named "sendFile( )" to send a single data file 150, and in FIG. 5, the system call interface 210 is invoked by calling a function named "sendFileArray( )" to send one or more data files. Each of these functions and their parameters are discussed in further detail below. Upon receiving an invocation of system call interface 210, as shown in block 315 of FIG. 3, operating system 130A may be configured to send data files 150 (identified by one or more function parameters) to client 125, without application 120 having to copy contents of the data files 150 into its application address space (block 320 of FIG. 3).

As noted earlier, system call interface 210 of operating system 130A may be used to send a single data file 150 or multiple data files 150 to client 125 via a connectionless network protocol. In the embodiment illustrated in FIG. 4 and FIG. 5, a first function (such as "sendFile( )") may be used to send part or all of a single data file 150, while a second function with a different name (such as "sendFileArray( )") may be used to send part or all of one or more data files. In other embodiments, only a single function may be provided to send any desired number of files, or more than two functions may be provided. In some embodiments utilizing a single function, it may be possible to send a single data file using a different (and potentially simpler) parameter set than the parameter set used to send multiple data files. It is noted that the specific syntax and parameters shown in FIG. 4 and FIG. 5 are examples intended to help describe the type of information that may be passed to system call interface 210, and do not reflect the actual syntax, function names, parameter names, or parameter types that may be used within an actual operating system such as a version of Solaris™ or Windows™. For example, descriptive names such as "packet-Size" are used for parameter types in FIG. 4 and FIG. 5, instead of type names such as "int" or "size_t" that may be used in various operating systems.

FIG. 4 illustrates one example of a set of parameters that may be used to send a single data file 150 using a function named "sendFile( )" to invoke system call interface 210. In FIG. 4, the parameters to sendFile( ) include endPoint ep, fileDescriptor fd, startOffset so, amountToSend ats, packetSize ps and flags fg. The parameter endPoint ep may identify a communication end point, such as a socket, that may be used to communicate with client 125 via a connectionless network protocol. As described below in conjunction with the description of FIG. 8, the communication endpoint may be established by application 120 in cooperation with client 125. The parameter fileDescriptor fp may be an identifier or handle for the data file 150. The parameter startOffset so may indicate a starting offset within the data file 150 identified by fileDescriptor fd. Blocks of data file 150 starting at startOffset so may be sent to client 125, while blocks located at smaller offsets within data file 150 may not be sent. The number of blocks to send, or the amount of data of data file 150 to be sent, may be specified by the parameter amountToSend ats. By adjusting startOffset so and/or amountToSend ats, application 120 may send any desired subset of the data file 150, instead of the whole file. That is, the depicted parameter set allows application 120 to send the entire data file 150 (e.g., by setting startOffset so to "0" and amountToSend ats to the size of the data file 150), or a specified portion of the data file 150, in a single invocation of the sendFile( ) function. In some implementations, a particular value of ats (such as "0" or "−1") may be used to indicate that the entire contents of the data file 150 are to be sent, instead of application 120 having to specify the exact length of the data file 150.

The size of the individual packets or datagrams that may be used to send the data by operating system 130A may be specified by the parameter packetSize ps. In some embodiments, packetSize ps may indicate a desired or preferred packet size, and while operating system 130A may attempt to generate packets of a size equal to the preferred packet size, one or more packets sent by operating system 130A may differ in size from ps. Any desired units (such as bytes or disk blocks) may be used to specify startingOffset, amountToSend and packetSize.

The parameter flags fg may be used to specify various desired characteristics of the data transmission, such as a relative priority or a method of notification of application 120 upon completion of data transmission by operating system 130A in response to the invocation of sendFile( ). For example, in some embodiments, it may be possible for application 120 to specify a priority level with each invocation of sendFile( ), so that more important data files 150 may be transmitted earlier than other, less important data files. In other embodiments, a particular setting of fg may be used to indicate, for example, that a specific operating system signal or some other specified mechanism may be used by operating system 130A to notify application 120 when all the data of the data file 150 has been sent. A flags parameter may be implemented using a bitmap in some embodiments.

FIG. 5 illustrates one example of a set of parameters that may be used to send one or more data files 150 using a function named "sendFileArray( )" to invoke system call interface 210. In FIG. 5, the parameters to sendFile( ) include endPoint ep, fileSpecArray fsa, arrayLength al, packetSize ps and flags fg. The parameters endPoint ep, packetSize ps and flags fg may be used for similar purposes as those described above for the corresponding parameters to sendFile( ). The parameter fileSpecArray fsa may include a collection of one or more file specification data structures 510, such as the array consisting of fileSpecArray[0], fileSpecArray[1], ... fileSpecArray[n−1] illustrated in FIG. 5. The number of elements within the collection fsa (e.g., "n" in the example shown in FIG. 5) may be specified using the parameter arrayLength al. Each file specification data structure 510 may, in turn, include a file identifier for a particular data file 150 (such as fileDescriptor fd0 in fileSpecArray[0], fileDescriptor fd1 in fileSpecArray[1], etc.), a starting offset within the data file 150 at which data transmission is to begin (such as startingOffset sf0 in fileSpecArray[0], etc.), and an amount of data of the data file 150 that is to be sent to client 125 (such as amountToSend ats0 in fileSpecArray[0], etc.). Thus, the parameter fileSpecArray fas may be used to specify the same type of information for one or more data files 150 that was provided by the parameters fileDescriptor fd, startingOffset sfo and amountToSend ats for a single data file 150 in the case of the sendFile( ) function illustrated in FIG. 4. Application 120 may be configured to allocate memory for, and populate the contents of, the desired number of file specification data structures 510 included in fileSpecArray fsa.

It is noted that the file descriptors of two or more file specification data structures 510 in fileSpecArray fsa may be identical, so that different fragments of a given data file 150 may be sent using a single invocation of sendFileArray( ). Alternatively, the same fragment or all of a given data file 150 may be sent repeatedly with a single invocation of sendFileArray( ). In some implementations, instead of providing a single parameter packetSize ps for all the data files 150 to be sent using an invocation of sendFileArray( ), the file specification data structures in fileSpecArray fsa may each include a field that may be used to specify the packet size separately for each file specification data structure 510. In addition, the flags fg parameter may also be used to specify desired relative sequencing of transmission of different data file portions or files specified in fileSpecArray fsa. For example, in one embodiment, application 120 may use the flags parameter to specify that the file fragments specified in fileSpecArray should be sent in array index sequence (i.e., the file fragment specified in fileSpecArray[0] should be sent before the file fragment specified in fileSpecArray[1], and the file fragment specified in fileSpecArray[0] should be sent before the file fragment specified in fileSpecArray[1], etc.). Another setting of the flags parameter may be used to specify that the different file fragments specified in fileSpecArray may be sent in any order, or that a specified subset of the file fragments should be sent earlier than the remaining file fragments, etc.

The ability to intersperse portions of multiple data files 150 with a single invocation of a system call interface such as sendFileArray( ) may be exploited by various applications 120 to perform a number of desired business functions. For example, a video service provider may wish to show short advertisements at intervals during the course of a motion picture or other video presentation. In such an environment, the video service provider application 120 may use alternate file specification data structures 510 to show segments of the video presentation, followed by advertisements. For example, fileSpecArray[0] may be used to transfer 15 minutes of the video presentation, fileSpecArray[1] may be used to transfer a 30-second advertisement, fileSpecArray[2] may be used to transfer the next 15 minutes of the video presentation, fileSpecArray[3] may be used for another 30-second advertisement, and so on. The segments of the video presentation corresponding to the 15-minute blocks may all be stored within a single large file, or in separate files. The advertisements may be selected dynamically (e.g., at the time that sendFileArray( ) is invoked) based on such factors as client profile information, time of day, geographical location of the client, etc. In some embodiments, a number of different advertisements may be transferred to client 125 using a single invocation of sendFileArray( ), and the client may be configured to display the advertisements in a desired sequence. In some embodiments, one or more data files 150 may be pre-formatted (e.g., by a pre-processing application or by application 120) for datagram-based transmission; for example, recommended record boundaries or datagram boundaries may be inserted in the data file to allow the application to send the contents of the data file in units expected or preferred by the client.

It is noted that one or more of the parameters described above for sendFile( ) sendFileArray( ) or their equivalents, may be omitted in various embodiments, and that other parameters not shown in FIG. 4 or FIG. 5 may be used instead of, or in addition to, the parameters described above. The arrayLength parameter may be omitted in some embodiments. An output parameter (i.e., a parameter written to by operating system 130A) may be provided in some implementations to indicate the amount of data transferred. In one embodiment, instead of specifying a communication endpoint, application 120 may be configured to provide a destination address (e.g., a host name and a port number) for client 125 as a parameter, and operating system 130A may create a communication endpoint using the destination address for use during file transfer. Similarly, instead of providing a file descriptor identifying an already open data file 150, in some implementations a file name may be provided as a parameter, and operating system 130A may open the file. In some implementations, more elaborate file transfer patterns may be specified using additional parameters in some embodiments, where, for example, certain specified blocks of one or more data files may be conditionally skipped by operating system 130A. Thus, in one specific implementation, parameters not shown in FIG. 4 or FIG. 5 may be used to specify that every $10^{th}$ (or Nth) block of a given data file 150 may be skipped by operating system 130A during file transfer to client 125 if operating system 130A detects certain adverse conditions. In some implementations, operating system 130A may be configured to use default values for one or more parameters if the parameter values are not specified by the caller.

The function or functions used to invoke system call interface 210 may each provide a return value to the caller, such as application 120, in some embodiments. The return value may include an indication of an absence of an error or a detection of an error. For example, in one implementation, operating system 130A may be configured to perform validation checks on one or more of the parameters passed to the function. If the parameters passed to the function are not valid (e.g., if there is a type mismatch between the actual parameter and the expected parameter, or if a given parameter does not lie within an expected range of values), an error code identifying the specific type of invalidation detected may be returned. Error codes may also be returned, if, for example, operating system 130A detects that a needed resource (e.g., memory) required is exhausted. In some implementations, an indication of the total number of bytes that the operating system 130A may have queued to send to client 125, or may have sent to client 125, as a result of the invocation of the system call interface may be returned if no errors are detected.

Figure 6:
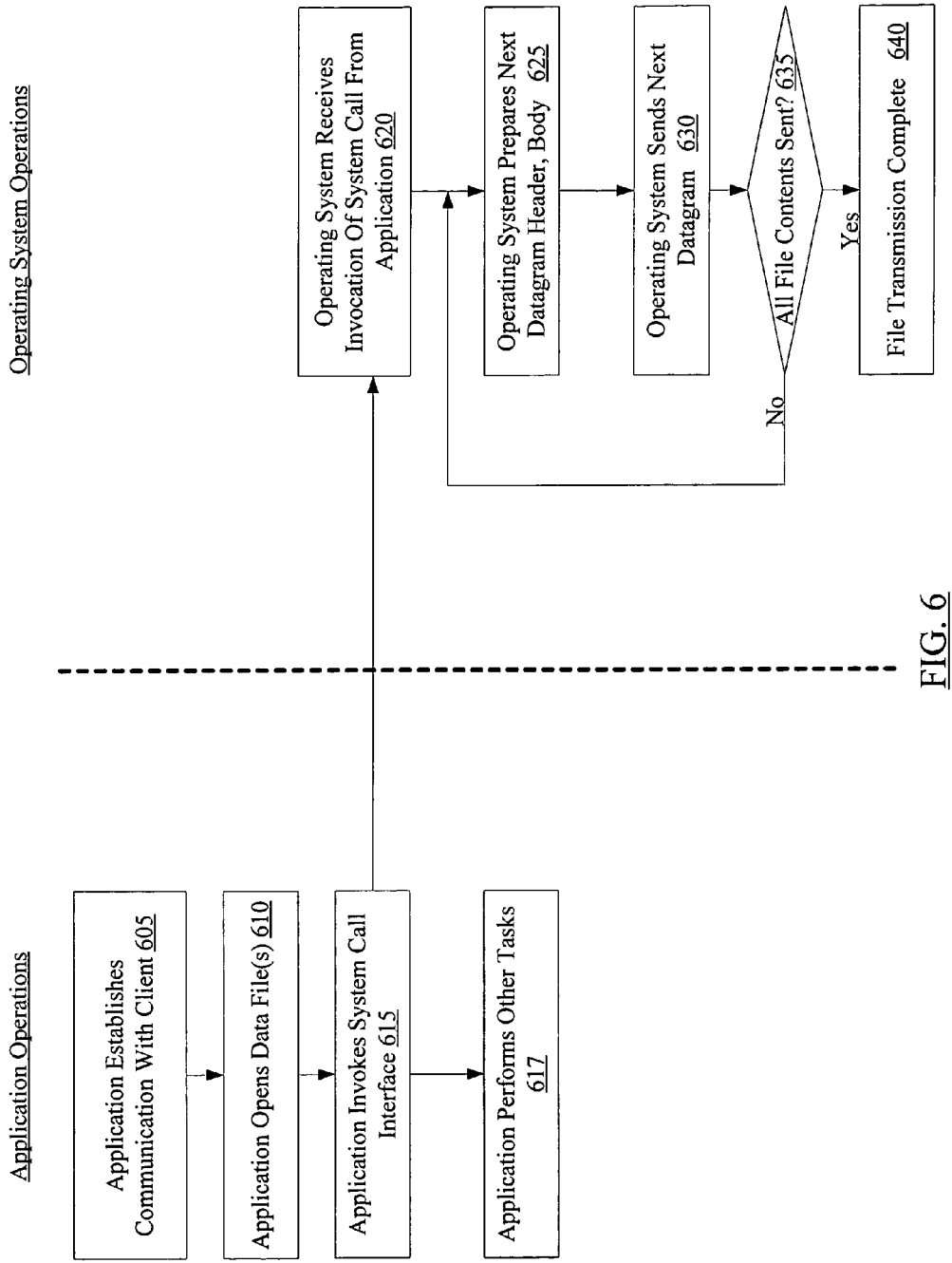
FIG. 6 is a flow diagram illustrating aspects of the operation of an application and an operating system in preparation for and during a transfer of one or more data files using a system call interface, according to one embodiment.

FIG. 6 is a flow diagram illustrating further aspects of the operation of application 120 and operating system 130A in preparation for and during a transfer of one or more data files 150 using system call interface 210, according to one embodiment. Prior to invoking the system call interface, as shown in block 605 of FIG. 6, application 120 may be configured to establish communication with client 125 (e.g., by invoking one or more system call interfaces other than system call interface 210) via a connectionless network protocol. Client 125 and application 120 may both need to cooperate in the establishment of communication, for example by participating in a multi-step handshake protocol, which may include a creation of a communication endpoint at both hosts 101A and 101B, and an association of network addresses with the endpoints. Application 120 may then open one or more data files 150 (block 610), and invoke the system call interface 210 (block 615) using a function similar to those illustrated in FIG. 4 and FIG. 5. It is noted that application 120 is not required to read the contents of the data files 150, or copy contents of the data files to application address space (e.g., to a buffer allocated by application 120). Rather, application 120 may merely pass identifiers (such as file descriptors, handles, or file names) for data files 150 to the operating system when invoking system call interface 120. Identifiers for the communication endpoint created by the application 120, and other parameters similar to those described above may also be passed to the operating system 130A as parameters during the invocation.

Operating system 130A may receive the invocation of the system call interface 210 (block 620 of FIG. 6), and perform various validation checks on the parameters passed during the invocation, as described earlier. Operating system 130A may then proceed to generate datagrams or messages to transfer the contents of the data files 150 to be sent to client 125. Each datagram may typically include a header containing control information and a body containing the data being transferred. As noted earlier, typically each datagram sent using a connectionless network protocol is treated independently from any other datagram, and may therefore include destination address information. The destination address information, as well as other metadata related to the contents of the datagram (such as the header length and the number of bytes of data being sent) may be included in the datagram header.

A given data file 150 (or a segment of a given data file 150 specified by a starting offset and a length during system call interface invocation) may be sent to client 125 using one or more datagrams. Operating system 130A may be configured to prepare the header and body for each datagram (block 625). The preparation may include a number of operations, for example, allocating memory for the header and the body, populating various fields of the header, reading contents of a data file 150 from a storage device 140A or from kernel cache 215 and copying the data to the memory allocated for the body. It is noted that the application 120 is not required to allocate memory for or generate the content of individual datagram headers, as in some traditional data transfers over connectionless protocols; instead, these tasks are handled by the operating system 130A. The datagram prepared by the operating system 130A may then be sent to the client (block 630). In preparing a given datagram, in some implementations operating system 130A may make a best effort to set the datagram size to match a packetSize parameter passed during the invocation of the system call interface 210. However, the operating system may be configured to use a different datagram size if, for example, the different datagram size may help performance. After a particular datagram is sent, operating system 130A may check whether all the data file contents specified in the invocation of the system call interface 210 have been sent (decision block 635). If some data remains to be sent, the steps of preparing and sending datagrams (blocks 625 and 630) may be repeated by operating system 130A for the remaining data, until the requested data file transmission is complete (block 640).

The application 120 may proceed to perform other tasks (block 617) after the system call interface has been successfully invoked. The other tasks could include a variety of operations in different embodiments. For example, in an embodiment where application 120 is an audio or video file server handling multiple clients 125, the other tasks may include preparation for (and invocation of system call interface 210 for) file transfer to a different client, or operations such as billing, report generation, inventory, etc. Thus, by invoking a single system call interface 210, application 120 may transfer responsibilities for the details of file transmission (e.g., generating/preparing the headers and bodies of the datagrams, and sending the datagrams) for one or more data files 150 or data file segments to the operating system 130A, and may be free to perform other needed functions at the application level while the data transfer is handled by the operating system. Operating system 130A may be aware of low-level details such as networking hardware or software performance characteristics (e.g., optimum packet sizes), which may not be known to application 120. This may allow operating system 130A to optimize the data transfer more effectively than may have been possible if application 120 were to perform data transfers at the datagram level. In addition, operating system 130A may be able to make use of a kernel cache to further improve data file transfer performance, as described below.

Figure 7:
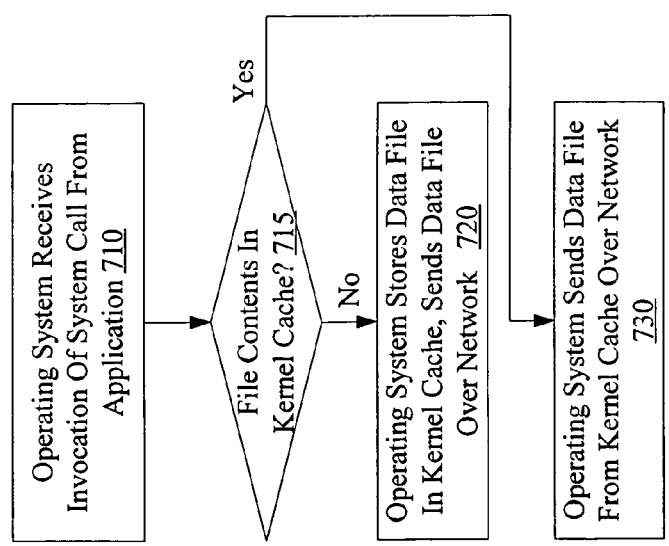
FIG. 7 is a flow diagram illustrating aspects of the operation of an operating system that includes a kernel cache according to one such embodiment.

As noted earlier and illustrated in FIG. 2, in some embodiments operating system 130A may include a kernel cache 215. Kernel cache 215 may be implemented in volatile storage such as system memory, in persistent storage, or in a combination of volatile and persistent storage in different embodiments. FIG. 7 is a flow diagram illustrating aspects of the operation of operating system 130A according to one such embodiment. Upon receiving an invocation of system call interface 210 (block 710 of FIG. 7), operating system 130A may be configured to check whether part or all of the data files 150 or data file segments specified in the invocation are resident within kernel cache 215 (decision block 715). If any of the data to be sent to client 125 is found to be resident in the kernel cache 215, operating system 130A may not have to read the resident data from a storage device 140A, and may send the resident data to the client from the kernel cache 215 (block 730). Data from the specified data files 150 or data file segments that is not found in the cache may be read in from a storage device 140A and sent to the client, and part or all of the data read in from the storage device 140A may be stored in the kernel cache 215 (block 720). Any desired cache replacement policy, such as a least-recently-used (LRU) policy, may be used to manage kernel cache 215. If an LRU cache replacement policy is in use, and application 120 requests a transmission of the same data file 150 or data file segment to one or more clients 125 within a relatively short time, the operating system 130A may not have to read the data file contents from storage device 140A, thereby reducing I/O and processing overhead. In a video or server environment, frequently accessed video or audio data may thus be transmitted with enhanced performance.

In some embodiments, operating system 130A may be configurable to modify one or more characteristics of the kernel cache 215, such as the size of the cache, the cache replacement policy, etc. Dynamic kernel cache reconfiguration may be supported in some implementations, while in other implementations, the operating system 130A may have to be restarted in order to reconfigure the cache. A variety of mechanisms may be used to reconfigure kernel cache 215 in different embodiments, such as configuration files, environment parameters, or additional system call interfaces. In addition, in some embodiments, it may be possible for an application 120 to use a parameter (such as the flags parameters described above) to provide caching hints to the operating system 130A when invoking system call interface 210. For example, in one embodiment, application 120 may use a "DO_NOT_CACHE" flag setting to indicate that the data files 150 being sent to client 125 should not be cached by operating system 130A (or alternatively, application 120 may use a "CACHE" flag setting, indicating that a data file should preferably be cached within kernel cache 215).

Figure 8:
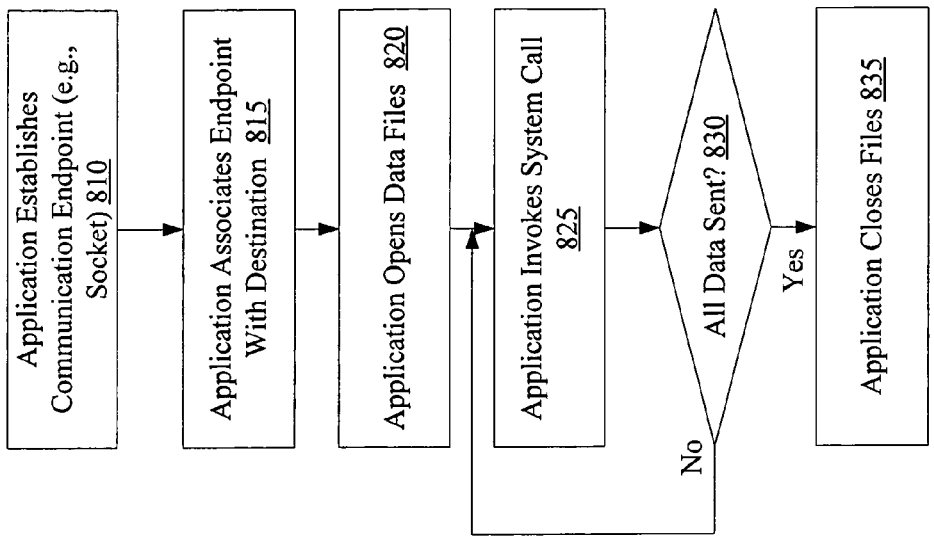
FIG. 8 is a flow diagram illustrating aspects of operations that may be performed by an application in order to send contents of one or more data files to a client, according to one embodiment.

FIG. 8 is a flow diagram illustrating further aspects of operations that may be performed by application 120 in order to send contents of one or more data files 150 to client 125, according to one embodiment. As noted earlier, application 120 may be configured to establish a communication endpoint, such as a socket, for communication with client 125 (block 810) via a connectionless network protocol, prior to beginning data file transfer. In one embodiment, for example, application 120 may invoke a system call interface, using a function such as socket( ), to establish the endpoint. One or more parameters of the function may identify the specific connectionless network protocol (such as UDP) to be used for communication via the endpoint. The client 125 may also be configured to create a communication endpoint at host 101B, for example by invoking a similar system call interface as the one invoked by application 120 at host 101A. Application 120 may then associate the endpoint it created with the destination, e.g., the client's network address (block 820), using another system call interface function such as connect( ). The application 120 may obtain the client's network address, prior to associating the endpoint, using a variety of techniques. For example, in one embodiment, client 125 may be configured to log in or otherwise authenticate itself as a trusted entity to application 120 prior to data file transmission. Authentication may be performed using a secure, reliable network connection using a connection-oriented protocol such as TCP. During the process of authentication or logging in, the network address to be used for subsequent data file transfers to client 125 may be obtained by application 120. In another embodiment, a well-known client network address (e.g., an address hard-coded within application 120) may be used. In another embodiment, a client 125 may initially send a datagram containing its network address to application 120 using a well-known address for application 120. An identifier (such as a socket descriptor or file descriptor) for the endpoint created by application 120 may also be passed to connect( ) or its equivalent function.

After associating the client 125 with the endpoint, application 120 may be configured to open the data file or files 150 whose contents are to be sent to the client (block 820). One or more additional system call interfaces (e.g., using the open( ) function) may be used to open the data files. In some embodiments, application 120 may be configured to open the data files 150 prior to the establishment of communication with the client 125; that is, the operations performed in block 820 may be performed before the operations in blocks 810 and 815. The application 120 may then invoke the system call interface 210 to initiate transfer of the data files (block 825). As noted earlier in the discussions of parameters to sendFile( ) and sendFileArray( ), application 120 may send portions or segments of one or more data files 150 with a given invocation of the system call interface 210, or may send the entire contents of one or more data files with a single invocation. In cases where the application 120 is configured to use more than one invocation of the system call interface 210 to send a given data file 150, application 120 may check whether the entire data file 150 has been transferred (decision block 830), and repeat invocations of system call interface 210 until the desired amount of data has been sent. After completing the data transfer, application 120 may be configured to close the data file or files 150 (block 835). In one embodiment, for some types of applications 120, where for example client 125 may be expected to generate multiple data file requests within a relatively short period of time, application 120 may maintain (i.e., keep open) the communication endpoint created earlier for a specified period of time after a particular data file transmission. In other embodiments, the endpoint may also be closed after the data file transmission.

Figure 9:
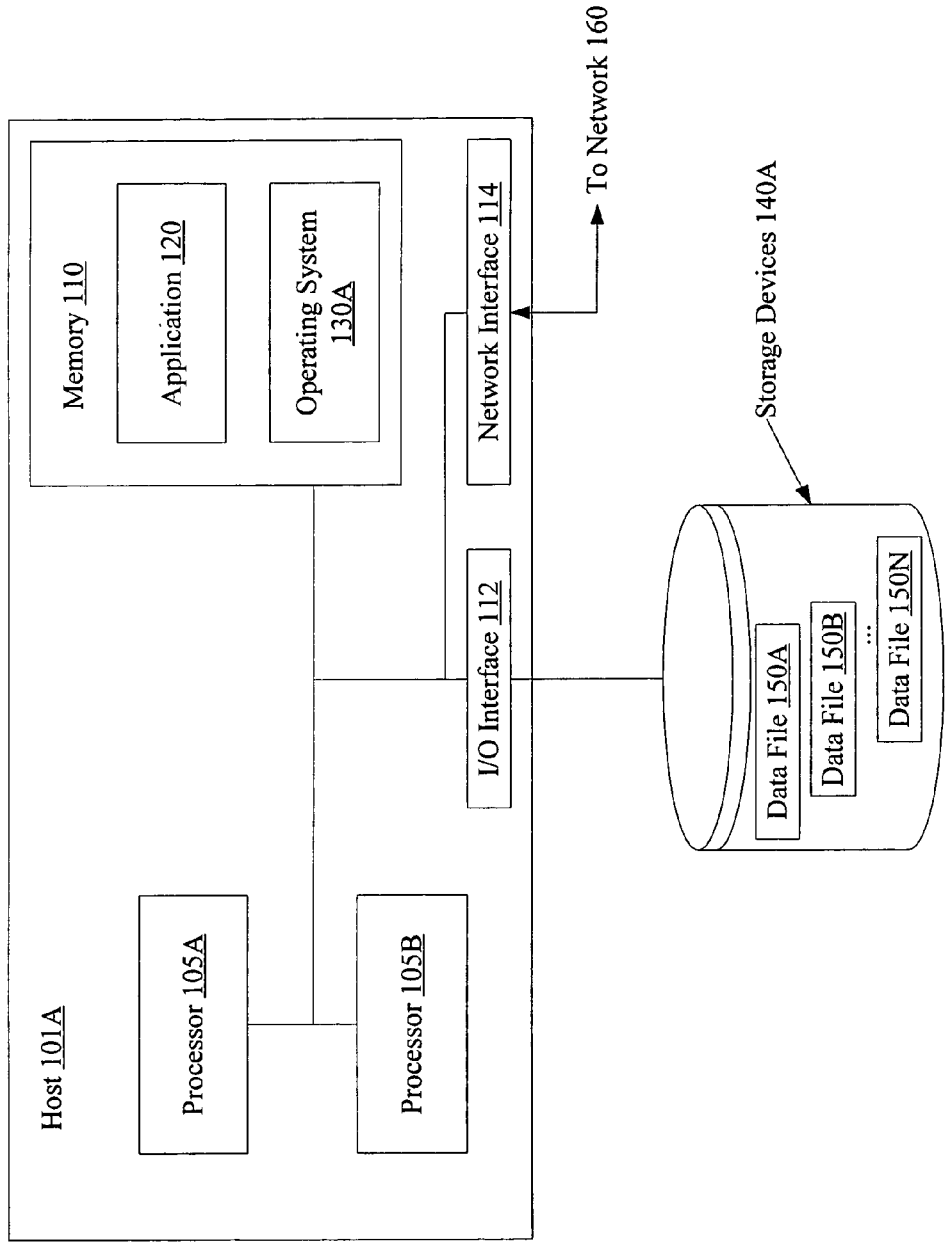
FIG. 9 is a block diagram illustrating constituent elements of a host, according to one embodiment.

FIG. 9 is a block diagram illustrating constituent elements of a host 101A, according to one embodiment. As shown, host 101A may comprise one or more processors such as processors 105A and 105B coupled to one or more memories such as memory 110. Processors 105A and 105B may be implemented using any desired architecture or chip set, such as the SPARC™ architecture from Sun Microsystems or the x86-compatible architectures from Intel Corporation, Advanced Micro Devices, etc. Program instructions that may be executable to implement the functionality of application 120 and/or operating system 130A may be partly or fully resident within a memory 110 at a given point in time. Memory 110 may be implemented using any appropriate medium such as any of various types of RAM (e.g., DRAM, SDRAM, RDRAM, SRAM, etc.). Host 101A may also include one or more I/O interfaces 112 providing access to storage devices 140A, and one or more network interfaces 114 providing access to network 160. In addition to data files 150, part or all of the program instructions that may be executable to implement the functionality of operating system 130A and/or application 120 may also be stored within storage devices 140A.

Storage devices 140A and 140B may include any desired type of persistent and/or volatile storage devices, such as individual disks, disk arrays, optical devices such as CD-ROMs, CD-RW drives, DVD-ROMs, DVD-RW drives, flash memory devices, various types of RAM and the like. In some embodiments where, or example, application 120 is a multimedia server, storage devices 140A may include one or more jukebox devices providing access to a library or collection of video and/or audio files. One or more storage devices 140A and 140B may be directly coupled to their respective hosts 101A and 101B in some embodiments (e.g., using the Small Computer Systems Interface (SCSI) protocol), or may be accessible over any desired storage interconnect such as a fiber channel fabric or storage area network (SAN) in other embodiments.

The sizes and formats of data files 150 may vary in different embodiments. For example, in some embodiments, data files 150 may be video, audio, or image files that may each be formatted according to a standard such as a version of the Moving Pictures Expert Group (MPEG) family of standards such as MPEG 2—Layer 3 (MP3), a version of the Joint Photographic Experts Group (JPEG) standard, or any other appropriate standard or format. Data files 150 may be stored and/or transmitted in compressed or uncompressed format in different embodiments. In one embodiment, for example, a data file 150 may be stored in uncompressed format on a storage device 140A, but may be compressed (e.g., by operating system 130A or by application 120) prior to transmission over network 160. As noted earlier, in some embodiments one or more data files 150 may be pre-formatted for datagram-based transmission; for example, a data file 150 may be logically divided (for example, by a preprocessing application or by application 120 in a preprocessing step prior to sending the data file) into segments, where each segment may be sent in a single datagram. In one embodiment, a data file 150 may also contain application metadata, such as frame sequence numbers in the case of a video data file that may be interpreted and used by client 125 in an application-specific manner. The metadata may be inserted at appropriate offsets within the data file 150 by application 150 or by another application at host 101A prior to transmission of the file.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
a processor; and
a memory coupled to the processor and configured to store program instructions executable by the processor to implement:
an operating system comprising a system call interface for sending one or more data files to another system over a network via a connectionless network protocol;
an application configured to invoke said system call interface to initiate sending of one or more data files to another system over the network, wherein each of the one or more data files is stored on a storage device as pre-formatted data divided into multiple segments by datagram boundaries, and wherein contents of the one or more data files are not in an address space of the application;
wherein, in response to an invocation of said system call interface by the application, the operating system is configured to send the one or more data files including the contents to the another system over the network without the application copying the contents of the one or more data files into the address space of the application, wherein the operating system reads the one or more files from the storage device and prepares a plurality of datagrams for sending the contents of the one or more files, each of the datagrams corresponds to a respective one of the multiple segments and comprises a respective connectionless-protocol header and body;
wherein, in response to the same invocation of the system call interface, the operating system is configured to:
generate and prepare the connectionless-protocol header for each datagram of the plurality of datagrams without the application generating content for the header; and
send the plurality of datagrams to the another system over the network without the application copying the contents of the one or more data files into the address space of the application.

2. The system as recited in claim 1, wherein the connectionless network protocol is the User Datagram Protocol (UDP).

3. The system as recited in claim 1, wherein the at least one of the one or more data files comprises multimedia content.

4. The system as recited in claim 1, wherein the operating system is further configured to store at least one data file of the one or more data files in a kernel cache, and to send the data file from the kernel cache to a client system in response to another invocation of the system call interface by the application.

5. The system as recited in claim 1, wherein the application is configured to perform one or more other tasks while the operating system sends the one or more data files.

6. The system as recited in claim 1, wherein the invocation of the system call interface includes a parameter specifying at least one of: a data file of the one or more data files, a communication endpoint, a starting offset within the data file, a packet size, and an amount of data of the data file to be sent to the another system.

7. The system as recited in claim 6, wherein the communication endpoint is a socket.

8. The system as recited in claim 1, wherein the invocation of the system call interface includes a parameter specifying a collection of one or more file specifications, wherein each file specification of the one or more file specifications includes a field identifying a particular data file of the one or more data files.

9. A method, comprising:
providing a system call interface in an operating system for sending one or more data files to a destination system over a network via a connectionless network protocol;
receiving an invocation of the system call interface from an application at the operating system to initiate sending one or more data files to another system over the network, wherein each of the one or more data files is stored on a storage device as pre-formatted data divided into multiple segments by datagram boundaries, and wherein contents of the one or more data files are not in an address space of the application;
in response to the invocation of the system call, the operating system sending the one or more data files including the contents to the destination system over the network without the application copying the contents of the one or more data files into the address space of the application, wherein the operating system reads the one or more files from the storage device and prepares a plurality of datagrams for sending the contents of the one or more files, each of the datagrams corresponding to a respective one of the multiple segments and comprising a respective connectionless protocol header and body;
in response to the invocation of the system call interface, the operating system preparing the connectionless protocol header for each datagram of the one or more datagrams without the application generating content for the header.

10. The method as recited in claim 9, wherein at least one of the one or more data files comprises multimedia content.

11. The method as recited in claim 9, further comprising:
the operating system storing at least one data file of the one or more data files in a kernel cache; and
the operating system sending the data file from the kernel cache to a client system in response to another invocation of the system call interface by the application.

12. The method as recited in claim 9, wherein the invocation of the system call interface includes a parameter specifying at least one of: a data file of the one or more data files, a communication endpoint, a starting offset within the data file, a packet size, and an amount of data of the data file to be sent to the another system.

13. The method as recited in claim 12, wherein the communication endpoint is a socket.

14. The method as recited in claim 9, wherein the invocation of the system call interface includes a parameter specifying a collection of one or more file specifications, wherein each file specification of the one or more file specifications includes a field identifying a particular data file of the one or more data files.

15. The method as recited in claim 9, further comprising:
the application creating a communication endpoint;
the application associating the endpoint with the destination system;
the application opening the one or more data files; and
the application passing a parameter in invoking the system call interface, wherein the parameter specifies at least one of: a data file of the one or more data files, the communication endpoint, a starting offset within the data file, a packet size, and an amount of data of the data file to be sent to the destination system.

16. A computer readable storage device comprising program instructions, wherein the instructions are executable to implement an operating system configured to:
provide a system call interface for sending one or more data files to a destination system over a network via a connectionless network protocol;
receive an invocation of the system call interface from an application to initiate sending one or more data files to another system over the network, wherein each of the one or more data files is stored on a storage device as pre-formatted data divided into multiple segments by datagram boundaries, and wherein contents of the one or more data files are not in an address space of the application;
in response to the invocation of the system call, send the one or more data files including the contents to the destination system over the network without the application copying the contents of the one or more data files into the address space of the application, wherein the operating system reads the one or more files from the storage device and prepares a plurality of a datagrams for sending the contents of the one or more files, each of the datagrams corresponding to a respective one of the multiple segments and comprising a respective connectionless protocol header and body;
wherein the operating system is configured to send a data file of the one or more data files using one or more datagrams, wherein each datagram of the one or more datagrams includes a connectionless protocol header, and wherein, in response to the invocation of the system call interface, the operating system is configured to prepare the connectionless protocol header for each datagram of the one or more datagrams without the application generating content for the header.

17. A computer readable storage device as recited in claim 16, wherein the at least one of the one or more data files comprise multimedia content.

18. A computer readable storage device as recited in claim 16, wherein the invocation of the system call interface includes a parameter specifying at least one of: a data file of the one or more data files, a communication endpoint, a starting offset within the data file, a packet size, and an amount of data of the data file to be sent to the another system.

19. A computer readable storage device as recited in claim 16, wherein the invocation of the system call interface includes a parameter specifying a collection of one or more file specifications, wherein each file specification of the one or more file specifications includes a field identifying a particular data file of the one or more data files.

* * * * *